Dec. 16, 1947.  E. C. BLACKBURN ET AL  2,432,652
RECIPROCATING JAW NUT-CRACKING MACHINE
Filed May 27, 1944  5 Sheets-Sheet 1
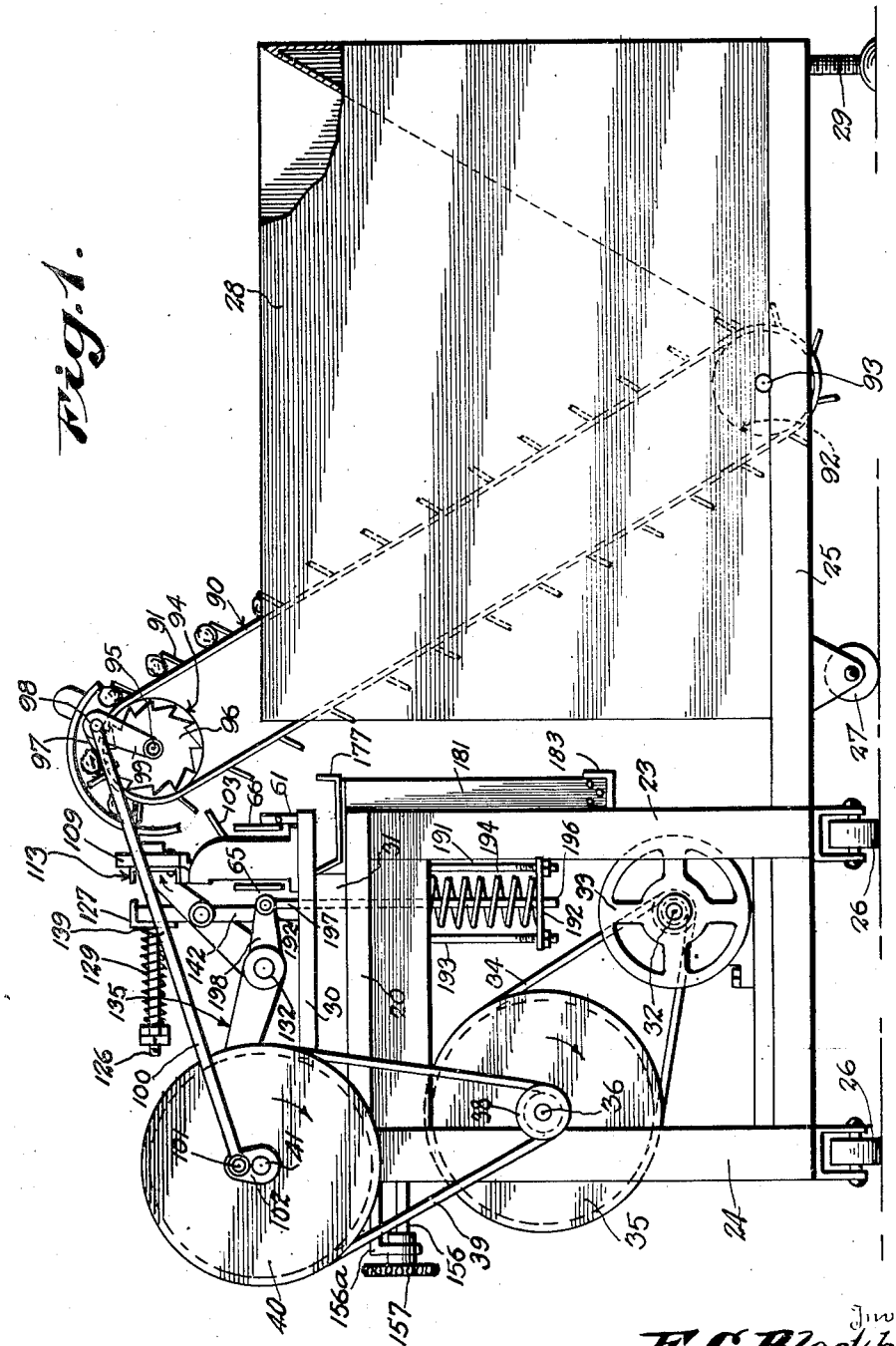
Inventor
E. C. Blackburn
E. S. Blackburn
By Munn, Liddy & Glaccum
Attorneys

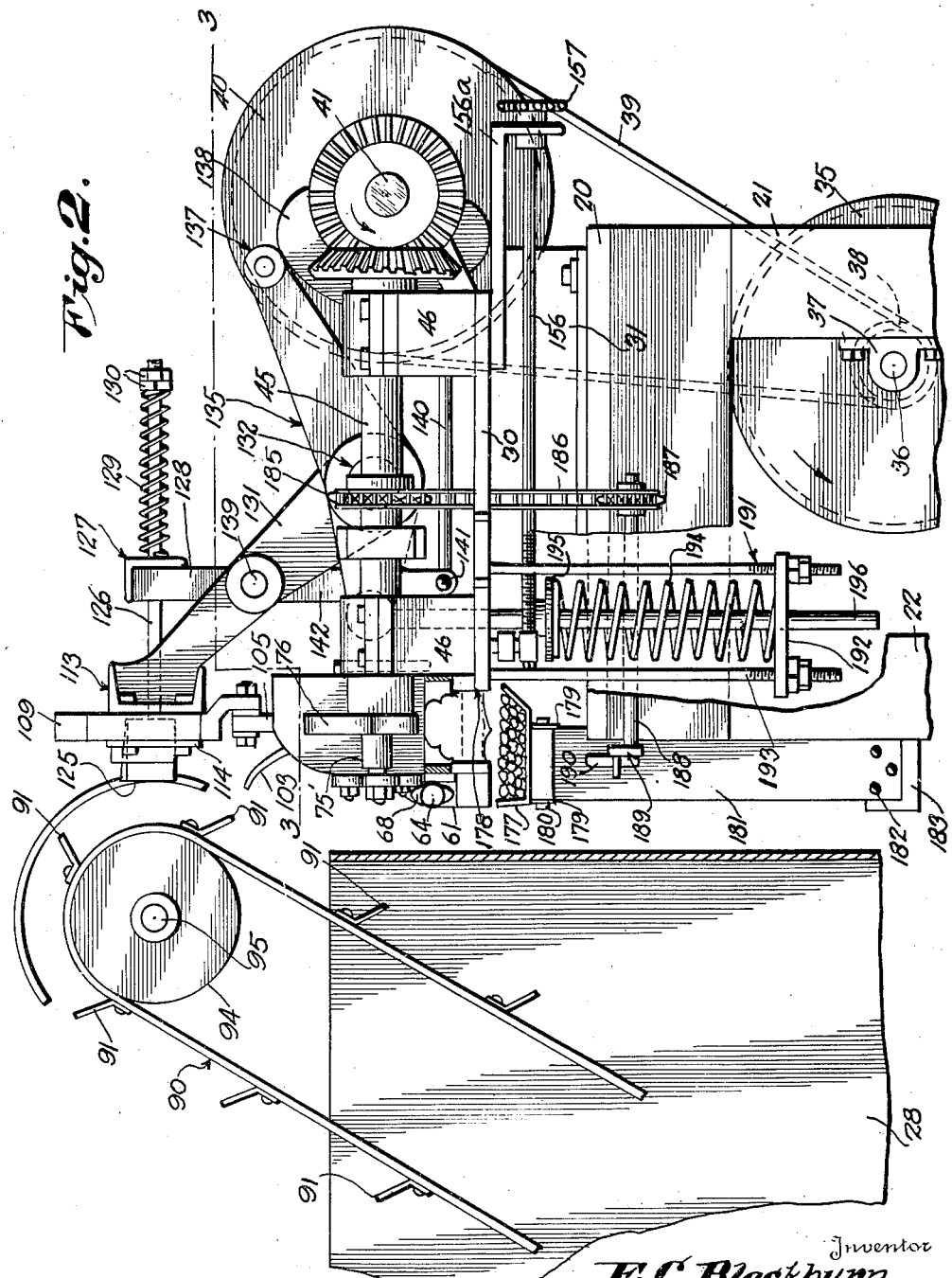

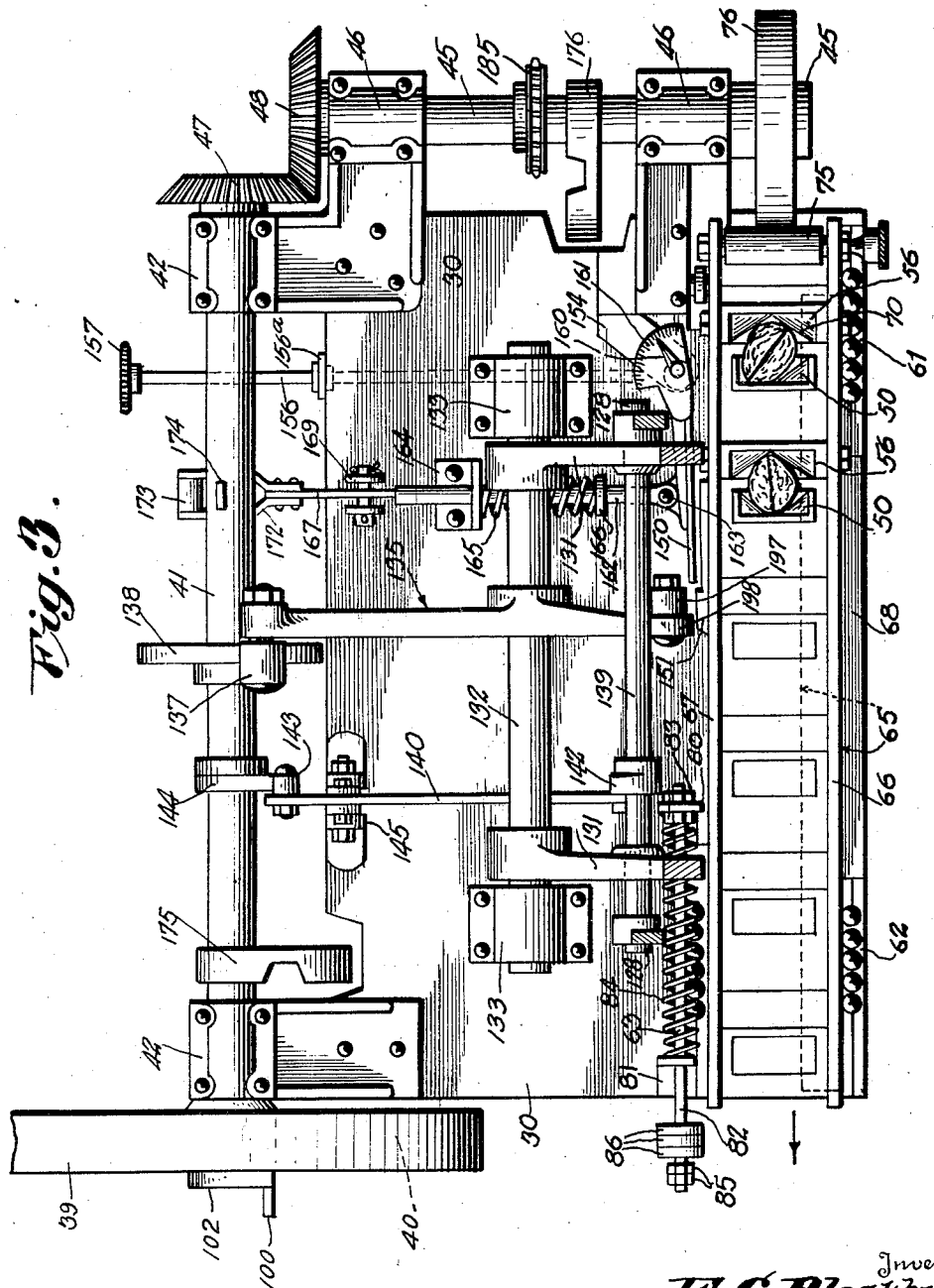

Dec. 16, 1947. E. C. BLACKBURN ET AL 2,432,652
RECIPROCATING JAW NUT-CRACKING MACHINE
Filed May 27, 1944 5 Sheets-Sheet 4
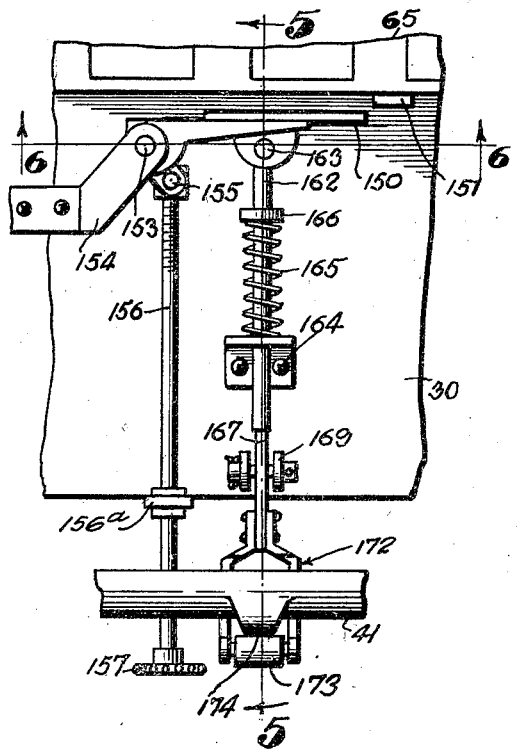
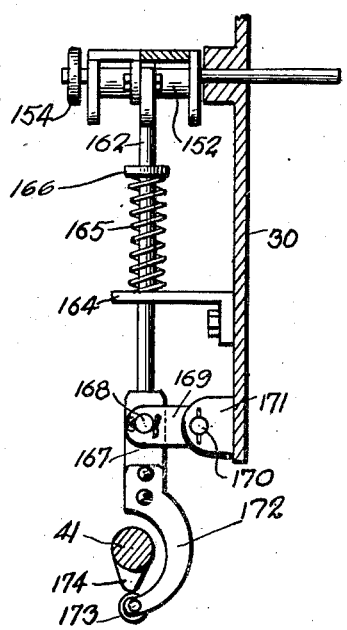
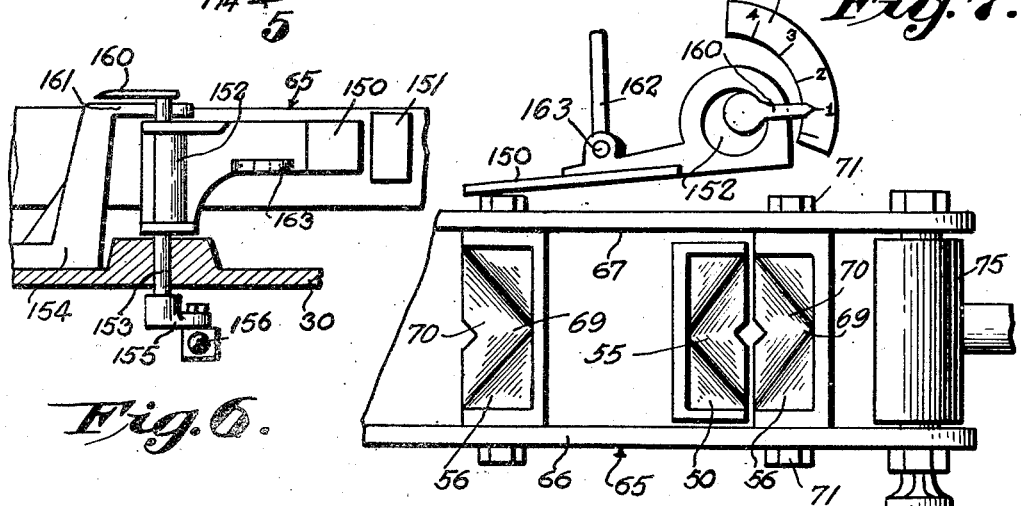

Dec. 16, 1947.  E. C. BLACKBURN ET AL  2,432,652
RECIPROCATING JAW NUT-CRACKING MACHINE
Filed May 27, 1944   5 Sheets-Sheet 5
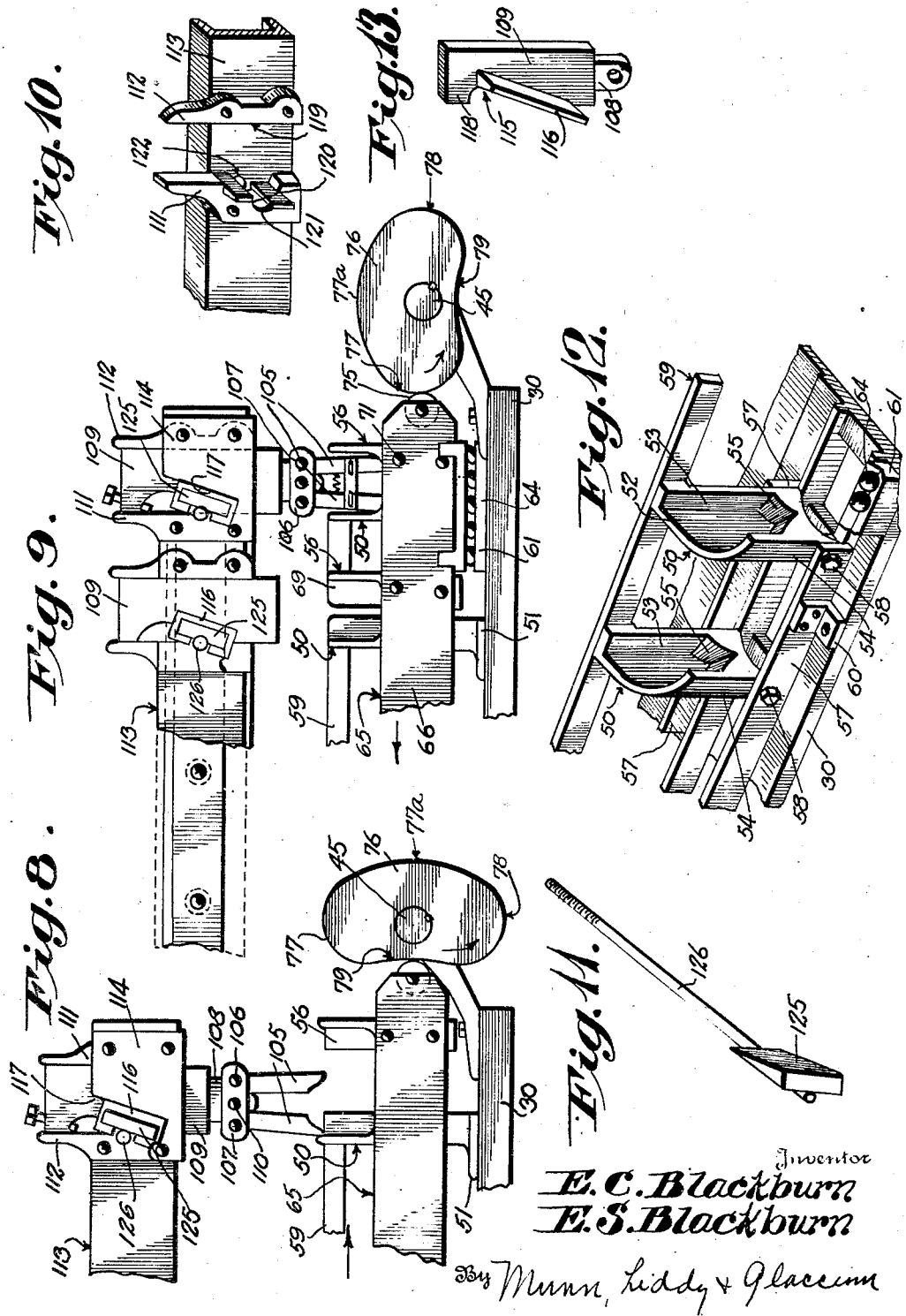

Patented Dec. 16, 1947

2,432,652

UNITED STATES PATENT OFFICE 2,432,652

RECIPROCATING JAW NUT-CRACKING MACHINE

Ernest C. Blackburn and Ernest S. Blackburn, Los Angeles, Calif.

Application May 27, 1944, Serial No. 537,617

12 Claims. (Cl. 146—12)

This invention relates to a machine for shelling nuts of the type known as the carpenter.

An object of the invention is the provision of a machine having groups of pairs of jaws to receive the nuts, with means for moving one of the jaws of each pair into close association with its companion jaws for crushing the shell without breaking the nut meat, with means for exerting pressure on the nuts in a downward manner to rigidly hold them in position during the shell crushing action.

Another object of the invention is the provision of a nut shelling machine in which a plurality of pockets are formed between pairs of crushing jaws, fingers being employed for exerting pressure on the nuts before and at the time the shells are being crushed, together with means for automatically regulating the pressure exerted by said fingers, depending upon the size of each nut with which they engage.

A further object of the invention is the provision of a machine for shelling nuts, in which a plurality of spaced movable jaws are adapted to be forced into operative relation with fixed jaws for crushing the shells of the nuts without breaking the nut meat, with means for returning the movable jaws to an inoperative position, the extent of the return movement being variously controlled.

Another object of the invention is the provision of a machine for shelling nuts, in which the movement of a crushing jaw cooperating with a fixed jaw is so controlled that the shells will be broken without crushing the nut meats, a plurality of fingers being employed for loosely engaging the nuts between the jaws before the crushing action takes place, with means for holding the fingers in most rigid relation with the nuts just before and during the crushing action, said fingers being moved downwardly at this time to exert pressure on the nuts.

A still further object of the invention is the provision of a machine for shelling nuts in which a row of nuts is fed periodically to pockets formed between pairs of fixed and movable jaws, means being employed for reciprocating the movable jaws to force them toward the fixed jaws for crushing the shells of the nuts, said movable jaws being returned to the normal open position, the reverse or return movement of the jaws being controlled in order to vary the open spaces between the fixed jaws and the respective movable jaws when in an inoperative position, a head carrying a plurality of groups of fingers, one group for each space between a movable jaw and a fixed jaw for exerting progressively increased pressure on the nuts before they are crushed and during the crushing action, said head being moved downwardly for carrying the fingers in a similar direction before each crushing action takes place.

In the drawings:

Fig. 1 is a view in elevation of one end of the machine.

Fig. 2 shows the opposite end elevation of the machine.

Fig. 3 is a horizontal section taken along the line 3—3 of Fig. 2 with the nut feeding mechanism removed.

Fig. 4 is a fragmentary plan view of a latch operating mechanism for controlling the reverse movement of the carriage carrying the movable crushing jaws.

Fig. 5 is a vertical section taken along the line 5—5 of Fig. 4.

Fig. 6 is a vertical section taken along the line 6—6 of Fig. 4.

Fig. 7 is a fragmentary plan view showing the crushing jaws in operative relation with the mechanism for controlling the reverse movement of the carriage, upon which are mounted the movable crushing jaws.

Fig. 8 is a fragmentary side view, showing the carriage and the movable jaws and associated operative parts, with the jaws in open position.

Fig. 9 is a similar view with greater detail showing the movable jaws in nut cracking relation with the associated fixed jaws.

Fig. 10 is a fragmentary view in perspective of guide bars and movable fingers which exert pressure on the nuts located between the jaws during the crushing operation.

Fig. 11 is a view in perspective of a wedge for retaining the pressure fingers shown in Fig. 9 against movement when said fingers are exerting the greatest degree of pressure on the nuts between the pair of jaws.

Fig. 12 is a fragmentary view in perspective of one corner of the base plate, showing several of the fixed jaws mounted thereon.

Fig. 13 is a view in perspective of a supporting block located between the guides in Fig. 10 and supporting the fingers which exert pressure on the nuts when a nut is located between a fixed jaw and a movable jaw.

Referring more particularly to the drawings 20 designates a table which is supported by legs 21 and 22 at one end thereof, while legs 23 and 24 support the table at the other end of the machine.

It will be noted from Fig. 1 that a bottom 25 is connected to the legs at one end of the machine and the bottom is supported by casters 26 and 27.

A bin 28 for storing the nuts before they are withdrawn to be crushed is carried by the bottom 25 and supported at its outer end by a leg or legs 29.

A base or horizontal frame 30 is supported by L-shaped flanges 31 which are bolted to the table 20. This base carries substantially the greater portion of the nut shelling mechanism.

A shaft 32 is driven by a motor 33 mounted on the bottom 25. This shaft drives a belt 34 which in turn rotates a pulley 35 secured to a shaft 36. This shaft is mounted in bearings 37 carried by the legs 21 and 24. A pulley 38 secured to the shaft 36 drives a belt 39 which in turn operates a pulley 40 secured to a shaft 41 which extends the length of the base and is mounted in bearings 42.

A second shaft 45 is located at right angles to the shaft 41 and is carried in bearings 46 projecting from one end of the base 30. A gear 47 is secured to the shaft 41 and meshes with a gear 48 secured to the shaft 45.

As shown more particularly in Figs. 3, 8 and 9, a plurality of fixed jaws 50 have flanges 51 at the lower ends secured to the base member 30. Each jaw has a vertical groove 52 and a straight vertically disposed side flange 53 and a curved flange 54. At the lower end of the groove is formed a V-shaped seat 55 which cooperates with a similarly formed seat in an associated movable jaw 56. Side faces of this V-shaped seat approximate one-half of a frusto-conical member.

Bars 57 extend along the base member 30 and are bolted as shown at 58 to the flanges 54 of the stationary cracking members, and a bar 59 is secured to the upper side of these vertical members.

L-shaped brackets 60 are bolted to the base member 30 and to the bars 57 so that the jaws 50 are rigidly held in place.

The carriage comprising the movable assembly of cracking jaws is mounted for reciprocatory movement on ball races 61, 62 and 63 containing balls 64.

The set of movable jaws 56 are mounted on a carriage 65 comprising side plates 66 and 67 (Figs. 3 and 7) to which they are secured by bolts 71 (Figs. 8 and 9), the plate 67 having a bottom flange 68 forming part of the ball races. It will be noted that each of these jaws is also provided with a vertical groove 69 and a bottom seat 70.

A roller 75 is mounted in the front end of the carriage 65 and is adapted to be engaged by a cam 76 secured to the shaft 45. When the shaft is rotated the cam 76 will likewise be revolved for forcing the carriage in the direction indicated by the arrow in Fig. 9. When either portion 77 or 78 of the cam engages the roller the carriage will be moved to the left in these figures to its farthest extent. However, when the shallow portion 79 of the cam 76 engages the roller 75 as shown in Fig. 8, the carriage will have been moved to its limit towards the right in Fig. 8. In other words, the carriage will have been returned to its inoperative or discharge position with the jaws 56 being moved away from the fixed jaws 50.

A bracket 80 is secured to the rear carriage plate 67 (Fig. 3) while a bracket 81 is secured to the base member 30. These brackets are provided with passages to receive a rod 82 which has a nut 83 at each side of the bracket 80 for maintaining the rod fixed to the carriage 65 so that the rod will be movable with said carriage. A compression spring 84 is located between the brackets 80 and 81 so that when the carriage 65 moves in the direction indicated by the arrow in Fig. 3 said spring will be compressed and will tend to return the carriage in the opposite direction. Nuts 85 are secured to the outer end of the rod 82 and at this point are provided with a plurality of spring washers 86 which are adapted to engage the bracket 81 on the return stroke of the carriage 65, and thus lessen the shock of the return movement.

Nuts are fed from a bin 28 (Figs. 1 and 2) by a traveling conveyor generally designated by the numeral 90 which has a plurality of spaced bars 91 disposed at an acute angle to the surface of the traveling conveyor 90 so that as the conveyor is moved through the bin 28 nuts will be picked up for feeding to the spaces between the jaws 50 and 56. The conveyor 90 and likewise the bars 91 extend substantially the full width of the carriage 65 so that as each bar 91 moves up it will feed a nut to each pair of jaws.

The bottom portion of the conveyor 90 is supported by an idling roller 92 mounted on a shaft 93 which is located in bearings (not shown but in the bin 28). The upper end of the conveyor is carried by a roller 94 which is secured to a shaft 95.

A ratchet wheel 96 is secured to the shaft 95 and is adapted to be engaged by a pawl 97 carried by a pin 98 on the upper end of a lever 99 which is loosely mounted on the shaft 95, a rod 100 having one end pivotally connected to the pin 98, while the other end is pivotally mounted on a crank pin 101 carried by a crank 102 which is secured to the shaft 41.

It will be seen by this construction that when the pulley 40 is revolved through 360 degrees that the pawl 97 will move the ratchet wheel 96 a distance of one tooth so that the feed of the nuts to the jaws will take place once for every revolution of the pulley 40. In other words, as will be presently seen the nuts are fed between the jaws when the movable jaws 56 have been moved to their retracted or open position.

A lip 103 extends the width of the conveyor 90 so that as the bars 91 move over the roller 94 they will deposit the nuts on said lips so that the nuts will roll between the open jaws.

Before the movable jaws 56 start to exert pressure on the nuts to be crushed a pair of fingers 105 are projected downwardly between each pair of open jaws 50 and 56 (Fig. 9) for exerting pressure on the nuts and this pressure is increased to almost the breaking point of the shells before the jaw 56 begins to crack the shells. The fingers 105 are pivotally mounted as shown at 106 on a pair of spaced bars 107 which embrace the lower reduced end 108 of a block 109 and are pivotally mounted thereon at 110.

Each of the blocks 109 is slidably mounted between a pair of guides 111 and 112 which are secured to a channel bar forming a head 113 which extends longitudinally over the sets of jaws. A plate 114 is secured to the outer faces of the guides 111 and 112 for maintaining the blocks 109 in position. It will be noted that there is one block 109 for each pair of fingers 105 so that a block is located above each pair of open jaws 50 and 56.

In conjunction with the downward movement of the head 113 provision is made for automatically controlling the position of the blocks 109 on the head to regulate the pressure imparted to the nuts by the fingers 105. Since the limits of movement of the head are fixed we utilize the travel of its actuating device to automatically set a series of gauges which independently determine the position of the blocks on the head and lock them in the position selected by the fingers 105 as they "feel out" the size of a nut. To these ends each block is cut away at one side on an angle as indicated at 115, leaving its top and bottom edges as bearing surfaces as indicated at 118. At the bottom of this cut-out and extending laterally therefrom is a flange 116 having an inclined face, which projects through an enlarged inclined slot 117 in the cover plate 114.

The flange 116 is in alinement with but spaced a slight distance from an inclined face on the guide 111 for the accommodation of a wedge 125 (Fig. 11) which is movable transversely of the head 113.

The wedge 125 is carried on a rod 126 which is movable longitudinally in the notch 121 of guide 111 and extends in rear of the head 113 through the aperture 122.

It will be noted there is a wedge 125 and a rod 126 for each one of the spaced blocks 109 and these rods extend through an L-shaped member 127 which is carried by the upper ends of a pair of levers 128 which rock on the shaft 139 (Figs. 2 and 3). A coil spring 129 is received by each rod between the L-shaped member 127 and nuts 130 on the end of the rod. Thus, it will be seen that the spring tends to move the wedge 125 between the associated block 109 and the guide 111 for rigidly maintaining the block in position when the levers 128 are moved in the direction indicated by the arrow in Fig. 2, for causing the fingers 105 to exert the maximum pressure on the nuts between pairs of the jaws 50 and 56 as will be presently explained.

The head 113 is supported and reciprocated by a pair of levers 131 which are rigid with a shaft 132 mounted in bearings 133 secured to the base member 30. When the levers 131 are oscillated by the shaft 132 the head 113 will be raised and lowered.

A prime mover for the head generally designated by the numeral 135 is rigid with the shaft 132 and is provided with a roller 137 which is in engagement with a cam 138 secured to the shaft 41 so that as the cam is revolved the bell crank 135 will be rocked and likewise the levers 131.

The vertical levers 128, as shown in Figs. 2 and 3, are connected rigidly with a shaft 139 journaled in an intermediate portion of the levers 131. Therefore, the levers 128 will be moved downwardly with the head 113 or upwardly as the levers 131 are rocked in opposite directions. However, during this movement of the levers 128 they are also rocked by means of a link 140 which is pivotally connected at 141 with a depending lever 142 which has its upper end secured to the shaft 139. The link 140 is provided with a roller 143 which engages a cam 144 secured to the shaft 41. By this construction the cam 144 will reciprocate the link 140 and rock the shaft 139 at each revolution of the shaft 41, so that the levers 128 will be moved to the right in Fig. 2, as indicated by the arrow for compressing the springs 129 and for forcing the wedges 125 between the sliding blocks 109 and the associated guides 111.

Thus the wedges 125 act to lock the blocks and set the fingers 105 in "feeling position," which they assumed upon engagement with the nut in the respective crusher pocket. The first downward movement of the head brings all of the fingers into engagement with the nuts. If the nuts are all of the same size then all of the blocks 109 will be on the same level, but if they are only slightly different in size (within the limitations allowed in grading) then said heads will all stand at different heights and will be locked in these positions by their respective wedges. Herein we have a complete compensation for nuts of various sizes which is wholly automatic in its operation.

The outer end of the link 140 adjacent the roller 143 is supported by a roller bearing 145 which is mounted on the base member 30.

We have provided a novel means for controlling the operation of the carriage, which determines the extent to which the jaws open to receive nuts (graded to size) and which is adjustable to regulate the crushing stroke applied to them, said control also providing for a full separation of the jaws after each crushing operation to permit the discharge of the shells and meat.

A latch member 150 has its free end in position to be engaged by a catch 151 which is secured to the inner plate 67 of the carriage 65. This latch member is adapted to control the distance that the carriage is returned from a cam surface where it had been previously set by the position 77 of the cam 76 as will be presently explained.

Referring more particularly to Figs. 4 to 7 inclusive, it will be seen that the latch member 150 is supported at one end by an eccentric 152 which has an eccentric pin 153 supported by a bracket 154. A lever 155 is secured to the eccentric pin 153 and an operating rod 156 has a screw threaded connection with the outer free end of this lever so that when the knurled knob 157 is revolved the pin 153 will be rocked to move the latch member 150 to alter the point at which the stop or catch 151 will engage it. The outer end of the rod 156 is rotatably supported in and held against longitudinal movement by a bracket 156a, secured to the bottom of the base member 30.

A pointer 160 on the eccentric 152 moves over a dial 161 which is graduated with reference to nut sizes, and may be read as indicating the crushing strength being applied to nuts of a given size. By rocking the eccentric through the rod 156 manually the latch member 150 is moved toward or away from the stop 151 for a purpose which will be presently explained. The finger moving over the dial indicates the position that the latch 150 will assume.

The latch 150 is moved away from the carriage 65 once every revolution of the shaft 41 by means of a rod 162 which is pivotally connected at 163 and is slidably mounted in a bracket 164 secured to the base member 30. A coil spring 165 located between the bracket 164 and a rigid collar 166 tends to move the latch 150 towards the carriage 65. The outer end of the rod 162 is provided with a bar 167, which is supported by a pin 168 on a rocker 169 pivoted at 170 on a bracket 171 secured to the base 30. On the outer end of the bar 167 is a fork 172 carrying a roller 173 which is adapted to be engaged by a cam 174 secured to the shaft 41 so that as the cam 174 engages the roller at each complete revolution of the shaft 41, the rod 162 will be reciprocated and the latch 150 will be moved out of the path of the stop 151 on the carriage 65.

Counter-balances 175 and 176 are secured to the shafts 41 and 45 for the purpose of equalizing the shock thereto during the crushing stroke applied to the movable jaws 56.

A tray 177 is disposed beneath the bottom of the base member 30 and beneath an opening 178 in the base member to receive the shells and the nut meats as they are discharged from the jaws periodically.

Ears 179 depend from the bottom of the tray 177 and are pivotally connected at 180 to legs 181 formed of spring metal which are secured as shown at 182 to brackets 183 extending from the legs 22 and 23.

A sprocket 185 on the shaft 45 drives a chain 186 (Fig. 2) and this chain in turn drives a sprocket 187 secured to a shaft 188. A crank arm 189 engages a strike plate 190 on one of the legs 181 of the shaker apparatus so that the tray 177 which is inclined downwardly toward one end where the shells and nut meats are discharged is constantly agitated and serves to separate the shells from the nut meats.

A damping arrangement, generally designated by the numeral 191 (Figs. 2 and 3), includes a cage consisting of a plate 192 supported by rods 193 projecting from the underface of the base member 30, with the bars being secured to said base member. A coil spring 194 has one end seated on the plate 192, while the other end is in engagement with a washer 195 secured to a plunger 196 which has its lower end slidably mounted in a passage in the plate 192 and this rod extends upwardly through a passage in the base member 30. The upper end of the plunger as shown at 197 is secured to the free end of the lever arm 198 on the shaft 132. This serves to hold the free end of the crank arm in contact with the cam 138 and to restore the head 113 to its normal elevated position after each crushing operation.

After a cracking operation when the point 78 of cam 76 passes into the position shown in Fig. 8 the carriage 66 is actuated by the spring 84 to move the jaws 56 away from the stationary jaws 50. This allows the cracked nuts to drop into the launder 177. In anticipation of the introduction of successive nuts into the cracking pockets these are positioned according to the graded nut size and with reference to the average hardness of their shells. The carriage 66 is moved to the left by the point 77 of the cam 76 and as this point leaves the roller 75 the return movement of the carriage is limited by the engagement of the stop 151 thereon with the latch member 150 which has been set to regulate the opening or nut receiving position of the jaws by the adjustment of the indicator 160 on its scale 161. Thus the several pockets are adjusted to receive nuts of the selected or graded size.

The operation of the machine is as follows:

Power being applied to the apparatus from the motor 33 causes the continuous rotation of the shaft 41 through the belting connections 34 and 39. The rotation of the crank arm 102 (Fig. 1) through the ratchet connection of the shaft 95 causes the step by step movement of the conveyor 90 and the deposit of nuts onto the lips 103 leading to the cracking pockets between the several pairs of jaws 50 and 56. The rotary motion imparted to shaft 45 through the beveled gears 47 and 48 causes the rotation of cam 76. When the latter is in the position shown in Fig. 8 the carriage 66 is impelled by the spring 84 to open the nut cracking pockets and allow the cracked nuts therein to fall out of them. As the cam 76 continues to revolve its point 77 advances the carriage and closes the pockets, but as this point leaves the roller 75 the carriage being again moved toward the right in Fig. 3 opens the pockets to the size determined by the indicator 160, which determines the arresting position of the latch member 150 when the latter is relieved by the cam 174 on shaft 41. When it is so relieved the latch member is projected by its spring 165 into alinement with the stop 151 on the carriage. The pockets being then in open position the descending nuts lodge therein. The time interval represented by the face 77a of cam 76 is sufficient to permit the following actions to occur: As the high point of cam 138 (Fig. 2) on shaft 41 approaches the roller 137 it raises the arm 135 thus oscillating shaft 132 to rock the arms 131 and start the downward movement of the head 113 causing the fingers 105 to crowd the nuts into the bottoms of the crushing pockets. These fingers coming in contact with the nuts adjust the position of blocks 109 on the head 113. As the downward movement of the head 113 commences, cam 144 on shaft 41 operating through rod 140, oscillates the shaft 139 to move the upper ends of levers 128 carrying frame 127 in the direction toward the left in Fig. 2, thus permitting the wedges 125 to become disengaged from the blocks 109 thereby releasing them. Cam 144 is so timed with reference to the downward movement of head 113 that after the several blocks 109 have become positioned (at or about the time the downward movement of head 113 is completed) the frame 127 will be moved in the direction shown by the arrow in Fig. 2 to compress the springs 129 and cause the retraction of the wedges 125, thus locking the blocks 109 to the head. The pivotal arrangement of the link 106 on which the fingers 105 are carried acts as a toggle causing said fingers to automatically adjust themselves to the contour of the nuts so that the fingers hold the nuts firmly against the bottoms of the pockets thus aiding in the crushing action at the instant when the movable jaws 56 of the several pockets are moved toward their stationary jaws 50 by the point 78 of cam 76 coming into engagement with the roller 75. After the completion of the crushing stroke just described the low point 79 of cam 76 arrives in the position shown in Fig. 8 whereupon the carriage 66 again moves to the right in Fig. 8 to the full extent of its movement to permit the discharge of the cracked nuts. At this time the cam 174 has retracted the latch member 150 to the position shown in Fig. 5 out of the path of the stop 151 on the carriage.

Thus, during one complete revolution of the cam 76 approximately one-half of the period of revolution is employed to form the pocket between the jaws 50 and 56 to hold a nut of graded size which is dropped therein at this time by the periodical movement of the conveyor 90.

Continued rotation of the cam 76 causes its portion 79 of smallest diameter to come opposite the roller 75 and the carriage with the jaws 56 will then return to its normally inoperative or full open position. In the meantime the cam 174 (Fig. 3) on the shaft 41 will come into contact with the roller 173 on the rod 162 moving the latch 150 out of alinement with the carriage stop 151 and the broken shells and meats will be discharged into the launder 177.

During the above operations the head 113 will be lowered and then returned to its initial position. At this time the fingers 105 will likewise be lowered in two steps. After the nuts fall into the pockets from the conveyor the head 113 descends and the fingers will rest on the nuts with the blocks 109 aiding in pressing the fingers 105 on the nuts. At this time the wedge operating rods 126 are moved in the direction indicated by the arrow in Fig. 2 by the oscillatory movement of shaft 139 imparted to it by the lever 142 which is rocked by the rod 140 through the action of the cam 144 on the shaft 41. This rocking of shaft 139 imparts movement to the lever arms 128 which causes compression of springs 129, forcing the wedges 125 into their seats between the blocks 109 and the guides 111 thus locking the fingers 105 in their initial position of adjustment.

Due to the particular construction of the cam 138, Fig. 2, which rocks the arm 135 and through it the arm 131 the head 113 is at this time lowered still further, thereby causing the fingers to engage the nuts with increased pressure as the jaws close in the crushing stroke.

There is an advantage to be found in the arrangement of fingers which adjust themselves to the contour of a nut in an open cracker pocket in that they insure its lying in the bottom of the pocket in the first instance and by applying pressure on top of the nut an equal pressure therefor is exerted upwardly while the side walls of the jaws close upon it. This engagement of a nut simultaneously on four sides permits its shell to be cracked with a minimum movement of the jaws and consequently with less damage to the meats.

We claim:

1. In a nut cracking machine, the combination with laterally movable jaws recessed to receive a nut and having side walls and bottoms extending laterally therefrom for supporting a nut, of a head located above and movable relatively toward and from said jaws, a finger carried thereon for engaging on top of a nut and forcing it against the bottoms in said jaws, means for locking the finger on the head following such engagement, driving devices actuating the head, the finger locking devices and closing the jaws while the nut is so held.

2. In a nut cracking machine, the combination with laterally movable jaws recessed to provide side walls and having laterally extending bottoms for supporting a nut, of a head located above and movable relatively toward and from said jaws, a finger carried thereon for engaging on top of a nut and forcing it against the bottoms within said jaws, a wedge movable transversely on the head for locking the finger thereon, means for actuating the wedge following such engagement of the finger with the nut, and driving devices timed to move the head toward the jaws and subsequently close the jaws while the nut is so held.

3. In a nut cracking machine, the combination with laterally movable nut cracking jaws recessed to receive a nut having bottoms supporting a nut, of a head movable vertically toward and from the jaws, a guide block carried by and movable vertically on the head having a toggle arm jointed thereon, two fingers suspended from said arm for engagement with a nut serving to hold it in engagement with said bottoms, and a locking member for securing the block in its position of automatic adjustment on the head, means for actuating the locking member, and driving devices sequentially moving the head, the actuating means and closing the jaws into cracking position.

4. In a nut cracking machine, the combination with a pair of laterally movable nut cracking jaws recessed to receive a nut and having bottoms, a cross head located above and movable vertically relatively to the jaws, and a finger movably mounted on said head for engaging and holding a nut against said bottoms, of means for locking the finger on the head in such holding position, an actuator operating to release such means during the descent of the head and to subsequently secure the finger to the head, and driving devices for operating the head subsequent to applying pressure on the nut and closing the jaws into cracking position.

5. In a nut cracking machine the combination with a pair of nut cracking jaws one of which is stationary, the other movable, said jaws being recessed and having bottoms, a movable head extending over the jaws and carrying a finger adapted to engage a nut and hold it in cracking engagement with the bottoms in said jaws, of a lever arm attached to the head, a cam for operating the head toward and from said jaws, a cam for moving the movable jaw into cracking position with the stationary jaw and means for rotating said cams in timed relation to actuate the head to first position a nut and secure it in the jaws and subsequently crack it.

6. In a nut cracking machine, the combination with a plurality of pairs of recessed jaws each having side walls and bottoms extending laterally toward each other for supporting a nut, one of the jaws of each pair being stationary, the other movable, a horizontally movable carriage carrying the several movable jaws and means normally acting in a direction to operate the carriage to move the jaws thereon into nut discharging position, of a cam acting on the carriage in three positions, first to allow the jaws to open, second to close them together from the discharge position and third to close them into cracking position, an adjustable latch controlling the carriage in its movement away from the closed position of the jaws and serving to hold them apart a distance to receive nuts of a selected size, and a trip for moving the latch into an inoperative position upon the completion of the movement of the jaws into the cracking position.

7. In a nut cracking machine, the combination with a frame, a horizontally movable carriage thereon, a pair of recessed jaws having bottoms, one of said jaws being supported on the frame, the other on the carriage, and means acting on the carriage normally impelling it to separate the jaws into a nut discharging position, of means for moving the carriage to close the jaws together in two successive movements, one being a crushing movement, a stop on the carriage, a retaining latch member positioned to engage said stop to limit the separation of the jaws following their release from the first closing movement, means for varying the position of the retaining latch member relatively to the movement of the carriage in accordance with given sizes of nuts to be received between said jaws and a trip for lifting the latch member out of the path of the stop operated simultaneously with the second movement of the carriage to permit it to move into the nut discharging position.

8. In a nut cracking machine, the combination with a pair of recessed jaws having bottoms for supporting a nut, a cam controlling the movement of the jaws toward each other into first a free position to permit subsequent setting and second for cracking a nut, and means normally acting in opposition to the cam to separate the jaws into nut discharging position, of a vertically movable head located above the jaws, a block movable independently thereon carrying a nut engaging finger, a member movable transversely of the head and block for locking the latter when the finger has pressed a nut against the bottom of the jaws, a pivoted lever for actuating said member, cams for moving the head toward and from the jaws and oscillating the lever relatively to the movement of the head both timed in relation to the jaw operating cam, an adjustable stop mechanism for limiting the separating movement of the jaws for the reception of nuts of selected sizes following their release from the free position and a trip serving to render such mechanism inoperative to allow their opening into the discharge position upon their release from the cracking position.

9. In a nut cracking machine, the combination with a pair of recessed jaws having bottoms for supporting a nut, a cam controlling the movement of the jaws toward each other into a free position to permit subsequent setting and again for cracking a nut, and means normally acting in opposition to the cam to separate the jaws into nut discharging position, of a vertically movable head located above the jaws, a block movable independently thereon carrying a nut engaging finger serving to force a nut against the bottoms of said jaws, a transversely operating wedge for locking the block to the head having a tail piece extending in rear of the head carrying a spring, an oscillating lever arm engaging the latter and moving in one direction to release the wedge on the downward movement of the head and swinging in the other direction to seat the wedge when the finger positions a nut in the jaws, means for reciprocating the head and oscillating said lever in timed relation to the operation of said jaws, an adjustable stop mechanism for limiting the separation of the jaws to form a pocket for the reception of nuts of selected sizes following their setting in the free position and a trip serving to render such mechanism inoperative to allow their opening into the discharge position after their movement into the cracking position.

10. In a nut cracking machine, the combination with a frame, a plurality of horizontally disposed pairs of recessed jaws having bottoms for supporting nuts, one jaw of each pair being mounted on the frame, the others being carried on a reciprocating carriage, a spring for moving the latter to position the jaws thereon in nut discharging position and a cam operating the carriage in the opposite direction to close the jaws together first in a free operation and second in a nut cracking operation, a fixed stop on the carriage, and a retaining latch member cooperating with the fixed stop and adjustable in the direction of movement of the carriage for limiting the separation of the jaws for the reception of nuts of a selected size and a trip for retracting the latch arm following a cracking operation, of a vertically movable head located above the jaws, a cam for operating the head, sliding blocks on the head for each pair of jaws carrying nut engaging fingers, locking members movable transversely of the head and blocks each having tail pieces extending in rear of the head, a crossbar engaging the several tail pieces, an oscillating lever and means for swinging it in one direction to move the cross bar to release the locking members on the downward movement of the head and in the other direction to retract said members to hold said fingers in nut engaging position prior to the cracking operation, and driving devices for rotating the several cams.

11. In a nut cracking machine, the combination with a frame, a horizontally movable carriage thereon, a pair of jaws, one on the frame the other on the carriage and both recessed to receive a nut against a supporting bottom, a cam having two high points for reciprocating the carriage in a direction to close the jaws toward each other, two low points one permitting its movement to open the jaws into nut discharging position the other to open the jaws part way into a nut receiving position, means for reciprocating the carriage in a direction opposed to the cam, of a stop adjustable to limit the movement of the carriage in the last mentioned direction to position the jaws for the reception of nuts of given size following the action of one of the high points of the cam and a tripping member for rendering the stop inoperative following the action of the second high point of the cam.

12. In a nut cracking machine, the combination with a frame, a horizontally movable carriage thereon, a pair of jaws, one on the frame the other on the carriage and both recessed to receive a nut against a supporting bottom, means yieldingly impelling the carriage in one direction to separate the jaws into nut discharging position, a cam for operating it in the opposite direction to alternately cause the jaw thereon to approach and recede from its companion jaw, of a retaining member on the frame movable laterally toward and away from the carriage for limiting the carriage movement in the jaw separating direction, and means for varying the position of said retaining member in a direction longitudinally of the carriage to regulate the opening beweeen said jaws for the reception of nuts of selected sizes and a trip for rendering the retaining member inoperative upon alternative reciprocations of the carriage.

ERNEST C. BLACKBURN.
ERNEST S. BLACKBURN.

REFERENCES CITED

The following references are of record in the file of this patent:

UNITED STATES PATENTS

| Number | Name | Date |
|---|---|---|
| 644,485 | Woodson | Feb. 27, 1900 |
| 928,958 | Gilson | July 27, 1909 |
| 1,272,803 | Hayes et al. | July 16, 1918 |
| 2,089,544 | Denison | Aug. 10, 1937 |
| 2,196,444 | Meyer | Apr. 9, 1940 |
| 2,296,088 | Carter | Sept. 15, 1942 |

FOREIGN PATENTS

| Number | Country | Date |
|---|---|---|
| 272,774 | Great Britain | June 23, 1927 |